Patented July 13, 1943

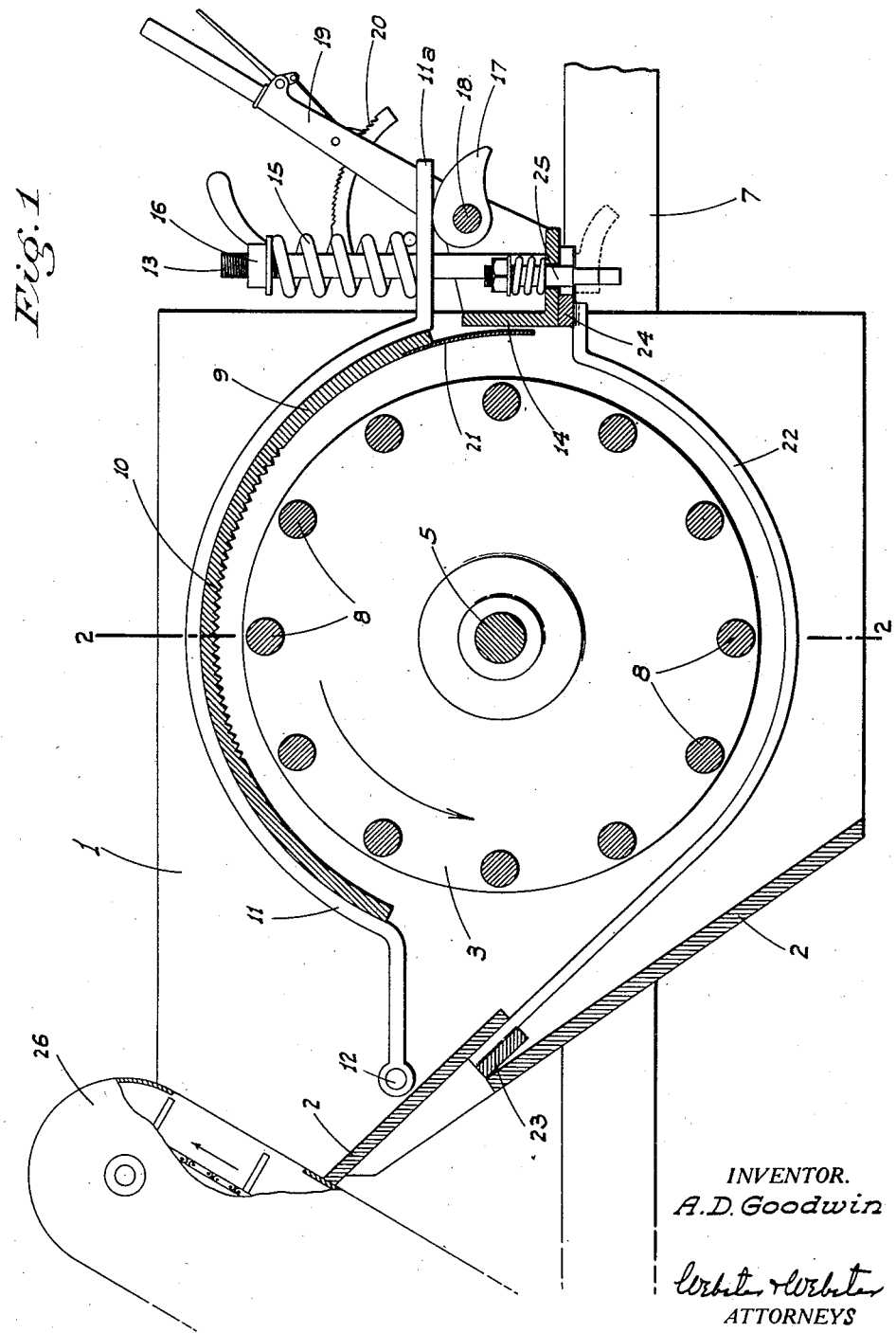

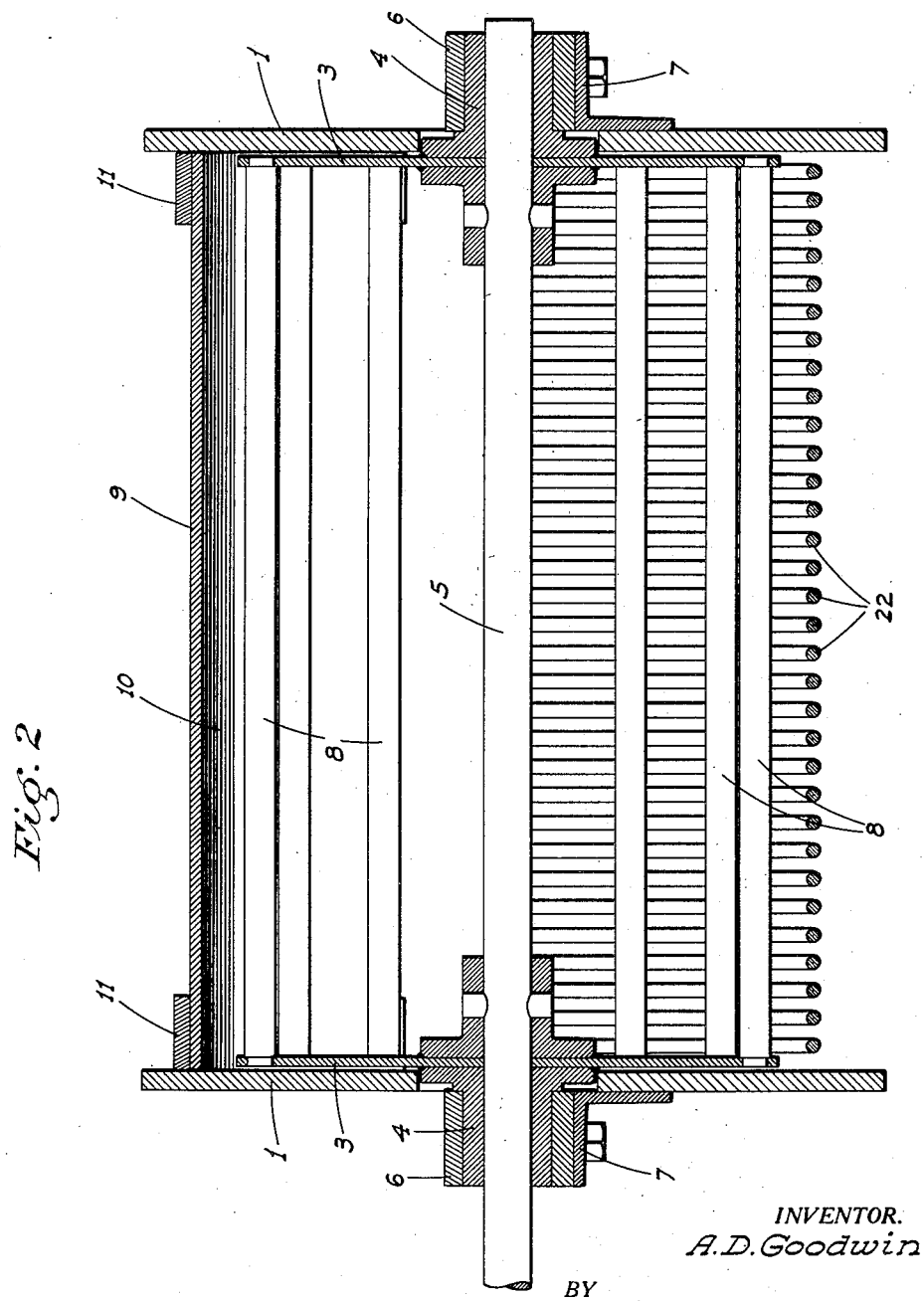

2,324,382

UNITED STATES PATENT OFFICE 2,324,382

NUT CRACKER AND SHELLER

Alfred D. Goodwin, Manteca, Calif.

Application December 27, 1940, Serial No. 371,863

2 Claims. (Cl. 146—11)

This invention relates to machines for shelling nuts and particularly almonds, my major objects being to provide a machine for the purpose which will effectively shell the nuts with a minimum of meat breakage, one which can be easily adjusted to operate on nuts of any size, and one which is sturdy and compact and yet of large capacity for its size.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a sectional elevation of my improved sheller.

Figure 2 is a transverse section on line 2—2 of Fig. 1.

Referring now more particularly to the characters of reference on the drawings, the housing of the sheller comprises spaced side walls 1 connected across their forward end, below the top, by overlapping vertically spaced walls 2 disposed with a downward slope to the rear. Turnable between walls 1 is a rotor comprising discs 3 disposed close to said walls but spaced from walls 2. The discs are provided with hubs 4 fixed on a drive shaft 5 adapted to be rotated by any suitable power at a medium speed and in a direction such that the forward side of the rotor turns downwardly. The hubs project through walls 1 and are journaled in bearings 6 mounted on horizontal frame beams 7 which also support the housing.

The discs are connected near their rim by a plurality of evenly spaced cracking bars 8, preferably of circular form. A concave cracking plate 9 cooperates with the rotor, being disposed above the upper portion of the same. This plate is circularly curved, of somewhat larger radius than the rotor but not concentric therewith; being spaced from the rotor at the top a distance less than the minor width of an almond, but at its ends, which are somewhat above the horizontal center of the rotor, being spaced from the rotor a greater distance than the width of an almond. The upper portion of the under or working face of the cracking plate is preferably roughened to provide for nut abrading as by means of a transverse tooth and groove arrangement as shown at 10.

The cracking plate extends closely between side walls 1 and forms the top of the housing, being mounted on straps 11 on top and at the sides. These straps extend forwardly from the cracking plate some distance and are pivoted at their forward end on walls 1 as at 12. The straps also extend rearwardly from the cracking plate to form horizontal ears 11a which are slidable through rods 13 upstanding from a transverse frame member 14 at the rear end of walls 1. Compression springs 15 on the rods above the straps bear down on the same, the effect of the springs being regulated to suit by hand nuts 16 threaded on the rods.

It will therefore be seen that the cracking plate may yield upwardly when operating on a mass of nuts with a developed pressure between the rotor and cracking plate due to such operation greater than a predetermined amount and thus avoiding the rigidity which might cause some nut shells to be crushed rather than cracked.

Downward movement of the cracking plate is limited, and such plate adjustably held at different normal spacing from the rotor by means of cams 17, one under each strap ear 11a rearwardly of rods 13. These cams are mounted on a common shaft 18, journaled in connection with frame member 14, and on one end of which is an upstanding lever 19 having a pawl and quadrant unit 20 associated therewith. The frame member 14 is below and of course clear of the adjacent end of plate 9, and to close the opening unavoidably left between the two, a skirt 21 depends from the plate 9 in overlapping relation to the member 14.

Disposed below the rotor is a grate comprising a plurality of bars 22 extending in a plane at right angles to shaft 5 and spaced apart a distance less than the minor width of any whole almond shell, but greater than the minor width of any whole almond meat. At the bottom of the grate, the bars are concentric with the rotor, and then slope upwardly substantially parallel to upper wall 2 to a termination under the same. At this end, the bars are connected by a cross bar 23 which, with the bars 22 removably seats in the space between upper and lower walls 2 as clearly shown. At their rear end, the bars are fixed on a cross bar 24 engaging the under side of frame member 14, to which it is yieldably and removably secured by suitable means such as a spring mounted turnable locking bolt 25. By this means, and upon release of the bolt, the adjacent end of the grate may be dropped, and the grate then pulled rearwardly to clear cross bar 23 from its seat. This enables a different grate, having a different bar spacing, to be easily and quickly mounted in position, as may be rendered necessary by the size of the almonds to be shelled.

The nuts to be shelled are dumped into the housing in the space between the forward end of plate 9 and the upper wall 2 and the grate by suitable means such as a conventional elevator 26. Due to the direction of rotation of the rotor, the nuts are conveyed rearwardly about the grate, and are then thrown centrifugally by bars 8 against the roughened cracking plate, as well as being carried circumferentially along the plate by said bars. As a result, the shells are all ultimately cracked and then broken away from the meats, the meats and shell pieces then dropping through the grate for segregation by other mechanism. An effective yet gentle cracking action is given the nuts due to the relative arrangement of the rotor and cracking plate, which provides a gradual restriction of the space between the rotor and cracking plate and avoids any sudden action which might cause the meats to be broken.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a nut sheller, a horizontal axis rotor having cracking elements disposed in a circular path concentric with its axis, a curved cracking plate extending about a portion of the rotor in spaced relation thereto, spaced straps rigid with and extending about the plate adjacent its side edges and projecting from one end thereof in a direction away from the rotor, means pivotally mounting the straps at their outer end, said straps projecting from the other end of the plate to form ears disposed substantially radial of the plate, fixed rods slidably projecting through the ears, adjustable springs on the rods engaging the ears in a direction to force the plate radially inward of the rotor, and stop means engaging the other side of the ears and limiting inward radial movement of the plate; said stop means comprising rotary cams and control means to rotate the cams.

2. In a nut sheller which includes a rotor disposed with its axis horizontal, the rotor having cracking elements disposed in a circular path concentric with said axis, a curved cracking plate extending in a circumferential direction about the upper portion of the rotor in spaced relation thereto, and a curved grate extending in a circumferential direction about the lower portion of the rotor in spaced relation thereto; the grate including curved bars extending about said lower portion of the rotor in said circumferential direction and thence extending at an upward slope away from the rotor to a termination at their upper ends in horizontally spaced relation to the adjacent end of the cracking plate, the opposite end of the cracking plate and the corresponding end of the grate having a gap therebetween, and means forming a circumferentially extending closure over said gap.

ALFRED D. GOODWIN.